(12) United States Patent
Oishi

(10) Patent No.: US 7,611,289 B2
(45) Date of Patent: Nov. 3, 2009

(54) ROLLERS WITH RETAINER

(75) Inventor: Shinji Oishi, Iwata (JP)

(73) Assignee: NTN Corporation, Osaka (JP)

( * ) Notice: Subject to any disclaimer, the term of this patent is extended or adjusted under 35 U.S.C. 154(b) by 738 days.

(21) Appl. No.: 11/235,604

(22) Filed: Sep. 26, 2005

(65) Prior Publication Data

US 2006/0067597 A1    Mar. 30, 2006

(30) Foreign Application Priority Data

Sep. 24, 2004   (JP)   ............................. 2004-276657
Sep. 24, 2004   (JP)   ............................. 2004-276658
Nov. 15, 2004   (JP)   ............................. 2004-330371
Nov. 16, 2004   (JP)   ............................. 2004-332228

(51) Int. Cl.
    *F16C 33/46*    (2006.01)
(52) U.S. Cl. ..................................... 384/572
(58) Field of Classification Search ................. 384/470, 384/572–573, 576, 578, 580; 29/898.061, 29/898.067
    See application file for complete search history.

(56) References Cited

U.S. PATENT DOCUMENTS 3,628,839 A * 12/1971 Vannest ........................ 384/470
4,208,078 A * 6/1980 Miki ............................ 384/572
4,435,024 A * 3/1984 Tagawa et al. ............... 384/576
4,502,740 A * 3/1985 Ohura et al. ........... 29/898.067
4,978,237 A * 12/1990 Motohashi et al. ........... 384/572
5,482,385 A * 1/1996 Yokota et al. ................ 384/572
5,636,720 A * 6/1997 Lederman ..................... 192/45
6,364,533 B1 * 4/2002 van der Knokke ........... 384/573
6,513,987 B2 * 2/2003 Takahashi et al. ............ 384/574
6,666,585 B1 * 12/2003 Kotzalas et al. .............. 384/578
2001/0051011 A1 * 12/2001 Takahashi et al. ............ 384/574

FOREIGN PATENT DOCUMENTS

| JP | 55049148 U | | 3/1980 |
| JP | 58017222 A | * | 2/1983 |
| JP | 2000179544 | | 6/2000 |
| JP | 2003166540 | | 6/2003 |
| JP | 2004019923 | | 1/2004 |

* cited by examiner

*Primary Examiner*—Marcus Charles
(74) *Attorney, Agent, or Firm*—Ditthavong Mori & Steiner, P.C.

(57) ABSTRACT

A retainer comprises a roller retaining click which is bent from an inner diameter edge of a rib portion toward the inside in an axial direction and extends so as to protrude and positioned between adjacent rollers. A part of the retainer other than the roller retaining click is hardened by high-frequency quenching and high-frequency tempering.

3 Claims, 16 Drawing Sheets

ROLLERS WITH RETAINER

BACKGROUND OF THE INVENTION

1. Field of the Invention

The present invention relates to a high-load capacity type of rollers with a retainer used in general industrial machinery.

2. Description of the Background Art

Japanese Unexamined Patent Publication No. 2000-179544 discloses rollers with a retainer in which a retainer 40 having an M-shaped section shown in FIGS. 20A and 20B is used, for example. The illustrated retainer 40 comprises a central circular part 41 having a diameter smaller than a roller pitch circle diameter PCD, an outer circular part 42 having a diameter larger than the roller pitch circle diameter PCD, and a pair of rib portions bent from both ends of the outer circular part 42 toward an inner diameter side. The outer circular part 42 prevents a roller 44 from escaping outside and the central circular part 41 prevents the roller 44 from escaping inside. That is, a width of an engaging part 46 which projects toward a pocket 45 is slightly smaller than an outer diameter of the roller 44. The engaging part 46 of the pocket 45 is elastically deformed when the roller 44 is mounted from the inner diameter side.

In general, in order to increase bearing load capacity in a limited space, the number of rollers is to be increased. However, according to the rollers with the retainer shown in FIGS. 20A and 20B, as the number of the rollers 44 to be set in the retainer 40 is increased in the limited space (predetermined inner and outer diameters), a dimension "a" of a pillar width shown in FIG. 20B becomes small and processing becomes limited and retainer hardness is lowered.

Japanese Unexamined Patent Publication No. 2003-166540 discloses rollers with a retainer which can house many rollers. The rollers with the retainer disclosed in the above document is shown in FIGS. 21 to 23. The illustrated rollers with the retainer comprise a retainer 51 consisting of an outward member 53, an inward member 54, and a plurality of rollers 52. The outward member 53 has a circular part 53*a* having a diameter larger than a pitch circle diameter PCD of roller arrangement and a pair of rib portions 53*b* in which both ends of the circular parts are folded into an inner diameter side. The inward member 54 is circularly formed so as to have a diameter smaller than the pitch circle diameter PCD of the roller arrangement. A plurality of pockets 55 and 56 are arranged in the circular parts 53*a* of the outward member 53 and the inward member 54 in the circumferential direction, and the roller 52 is housed between the pockets 55 and 56 of the outward and inward members 53 and 54.

As described above, when the retainer 51 comprises two components such as the outward member 53 and the inward member 54, pillar parts 57 and 58 between the pockets can be narrowed and many rollers 52 can be housed in the limited space. In addition, one member 53 has the rib portion, there is no problem even when it is sidably in contact with an adjacent component.

Meanwhile, according to the rollers with the retainer shown in FIGS. 21 to 23, since the retainer 51 comprises the outward member 53 and the inward member 54 to prevent the roller 52 from escaping, the number of components is increased and costs is increased. In addition, since the space in the bearing becomes small because of the inward member 54, it is considered that it brings a disadvantage in view of oil pass-through performance.

Rollers with a retainer shown in FIGS. 24 to 26 are described in Japanese Unexamined Patent Publication No. 2004-19923 to solve the above problems. The illustrated rollers with the retainer comprise a retainer 61 and a plurality of rollers 62. The retainer 61 comprises a pair of rib portions 63 which are opposed at a distance in the axial direction and a pillar part 65 provided between outer diameter edges of both rib portions 63 at a plurality of portions in the circumferential direction. The roller 62 is housed in the pocket provided between the adjacent pillar parts 65 of the retainer 61. Retaining means 67 for preventing the roller 62 from getting out to the inner diameter side of the retainer is provided at a part on an inner face of the rib portion 63 facing an end face of the roller 62 and between the adjacent rollers 62. The retaining means 67 is a projection comprising a staking portion.

According to the rollers with the retainer shown in FIGS. 24 to 26, the oil pass-through performance can be improved and the number of components can be reduced as compared with the one shown in FIGS. 21 to 23. However, when the staking part is formed, it is very difficult to provide a receiving member on the inner face side of the retainer rib portion 63, and when a dimension of the staking portion is unstable, many problems could occur in view of a manufacturing aspect and a quality aspect.

Thus, the applicant of this application tried to provide a bent-shaped roller retaining click instead of the retaining means 67 comprising the staking portion. The bent-shaped roller retaining click has been proposed in a bearing whose type is different from the rollers with the retainer, that is, in a cylindrical roller bearing having inner and outer rings in which the outer ring has an outer rib (Japanese Unexamined Utility Model Publication No. 55-49148). However, when a retainer disclosed in this document is used in the rollers with the retainer in which there is no inner and outer rings and the rollers are rolled and touched on an axis and a housing directly, it is necessary to harden the retainer to resist the contact between a peripheral device and the retainer and the like. When the hardened roller retaining click is bent after the roller is set in the pocket of the retainer, the roller retaining click could be damaged.

In addition, there is no example in which the retainer having the bent-shaped roller retaining click disclosed in the Japanese Unexamined Utility Model Publication No. 55-49148 is used in the conventional rollers with the retainer in which the rollers directly abut on the axis and the housing.

In the case of the retainer having a structure in which the roller retaining click is formed at the rib portion as means for preventing the roller from escaping to the inner diameter side of the retainer, unlike the M-shaped retainer shown in FIG. 10, since there is no roller guiding portion on the pitch circle diameter PCD of roller arrangement, the retainer is likely to run transversely because the roller is skewed and the like. In addition, since the number of the rollers is increased, the oil pass-through performance could be lowered as compared with the M-shaped retainer.

Furthermore, in the case of the retainer having the structure in which the roller retaining click is formed at the rib portion as retaining means for preventing the roller from falling to the inner diameter side of the retainer, stress is concentrated on a corner part of the retainer pocket during the operation and the retainer is damaged from this part in the worst case. This is because the roller presses the pillar part between the retainer pockets and load is repeatedly applied to a foot part (pocket corner part) of the pillar part. This will be described with reference to FIGS. 27 to 29.

As shown in FIG. 27, although corner curved parts 71 are provided at four corners of a retainer pocket 70, a radius "r" (refer to FIG. 28) of the corner curved part 71 is set so as to be smaller than a chamfered dimension "R" in general in order not to interfere with a chamfered part 81 of the roller 80 shown in FIG. 29. As the radius "r" of the corner curved part 71 becomes smaller, stress is more concentrated on the corner curved part 71 of the pocket 70.

In addition, in the case of the high-load capacity type of the rollers with the retainer, since the number of the rollers is more than that of the conventional one, the oil pass-through performance tends to get worse. Therefore, it is desired that the oil pass-through performance in the high-load capacity type of the rollers of the retainer is improved. Especially, it is important that the oil can easily pass through the pocket from the inner diameter side to the outer diameter side of the retainer.

The applicant of this application proposed a high-load capacity type of roller with a retainer in which processing is easy and oil pass-through performance is good in Japanese Patent Application No. 2003-190916 filed on Jul. 3, 2003. According to the rollers of the retainer, the roller is prevented from dropping outside by a roller stopper provided outside the retainer, and the roller is prevented from falling inside by a prevention click (inside roller stopper) provided at the rib portion. According to this kind of rollers with the retainer, an outer diameter guiding structure is designed in general in which a housing and an outer diameter of the retainer are in contact with each other while the rollers are operated between a shaft and the housing.

In addition, during the operation of the rollers with the retainer, the roller and the retainer are in contact with each other also. The contact pattern includes a contact between the roller and the outside roller stopper or a contact between the roller and the inside roller stopper. In addition, although a roller end face and the retainer are in contact with each other, there is no detailed description about this contact.

According to the rollers with the retainer disclosed in the Japanese Patent Application No. 2003-190916, under a condition in which the roller and the dropping prevention click (inside stopper) are in contact with each other, the roller attacks the dropping prevention click. Since hardness of the dropping prevention click is lowered by annealing in view of bending process after the roller is set in, it could be abraded or damaged.

SUMMARY OF THE INVENTION

It is an object of the present invention to provide rollers with a retainer in which high load capacity can be provided in a predetermined space, processing is easy, oil pass-through performance is superior, and a roller retaining click is not damaged when it is bent.

It is another object of the present invention to provide a high-load capacity type of rollers with a retainer in which a roller is prevented from being skewed and oil pass-through performance is superior.

It is still another object of the present invention to provide a high-load capacity type of rollers with a retainer in which the retainer is superior in hardness and oil pass-through performance is superior.

It is still another object of the present invention to provide a high-load capacity type of rollers with a retainer in which the roller and an outside roller stopper are surely in contact with each other during an operation in order to improve the rollers with the retainer disclosed in the Japanese Patent Application No. 2003-190916.

According to one aspect of the present invention, rollers with a retainer comprise the plurality of rollers and the retainer. The retainer comprises a circular part having a diameter larger than a pitch circle diameter of roller arrangement, a rib portion protruding from both sides of the circular part in an axial direction toward an inner diameter side, a plurality of pockets formed in the circular part so as to be arranged in a circumference direction between which a pillar part is formed so as to contain the rollers, retaining means for preventing the roller from escaping to the inner diameter side of the retainer. The retaining means comprises a roller retaining click which is bent from an inner diameter edge of the rib portion toward the inside in the axial direction and extends and positioned between the adjacent rollers.

One embodiment is characterized in that a part of the retainer other than the roller retaining click is hardened by high-frequency quenching and high-frequency tempering. Another embodiment is characterized in that the entire retainer is hardened by bright quenching and tempering and then the roller retaining click is annealed to relatively lower its hardness.

According to the above constitutions, since the pillar part and the roller retaining click of the retainer prevent the roller from escaping to the outer diameter side and to the inner diameter side, respectively, the configuration of the pillar part can be simple and the pillar part can be positioned more outside. As a result, a distance between the rollers can be reduced. Thus, since the number of the rollers can be increased in a predetermined space, large load capacity can be provided.

Since the roller retaining clicks which are provided at the rib portions prevent the roller from escaping to the inner diameter side, the retainer consists of one component, so that the number of components can be reduced and the costs can be reduced. Since the roller retaining click is provided at the rib portion, it can be partially provided in the axis direction unlike the pillar part. Therefore, the space in the bearing is not reduced and the oil pass-through performance is improved as compared with the case where the pillar part is provided on the inner diameter side.

The retainer is hardened by the heat treatment before the roller is set in. Although it is necessary to bend the roller retaining click to fix the roller after the heat treatment, when the hardened roller retaining click is bent, it could be damaged. Thus, according to one embodiment of the present invention, the part of the retainer other than the roller retaining click is hardened by the high-frequency quenching and the high-frequency tempering so that this roller retaining click is not quenched. According to another embodiment of the present invention, after the entire retainer is hardened by the bright quenching and tempering, the roller retaining click is annealed to relatively lower its hardness. In this constitution, since the hardness of the roller retaining click is lower than the other part of the retainer, the roller retaining click can be easily bent without being damaged.

Another example of the heat treatment for the retainer is carburized quenching. In this treatment, it is considered that when the retainer is hardened by the carburized quenching, the roller retaining click is to be prevented from being carburized so as to be easily bent. However, according to the above method, the number of processing steps is increased and a processing lead time is increased, causing a high cost.

In the case of the high-frequency quenching and the bright quenching, since the layer can be deeply hardened as compared with the carburized quenching, the hardness of the retainer can be improved. In addition, when the high-frequency quenching is employed, the number of processing steps is reduced and the processing lead time is reduced, so that the cost can be reduced as compares with the carburized quenching.

The retainer preferably contains 0.15 to 1.10% by weight of carbon. In this range, satisfactory quenching and pressing properties can be provided.

The hardness of the roller retaining click is preferably not more than HV400. When the roller retaining click has the above hardness, the bending process can be easily performed and the roller retaining click can be prevented from being damaged.

As described above, according to the present invention, there can be provided the rollers with the retainer in which the high-load capacity can be provided in the predetermined space, the processing is easy, the oil pass-through performance is superior, and the roller retaining click is not damaged when it is bent.

According to another aspect of the present invention, rollers with a retainer comprise the plurality of rollers and the retainer. The retainer comprises a circular part having a diameter larger than a pitch circle diameter of roller arrangement, a rib portion protruding from both sides of the circular part in an axial direction toward an inner diameter side, a plurality of pockets formed in the circular part so as to be arranged in a circumference direction between which a pillar part is formed so as to contain the rollers, retaining means for preventing the roller from escaping to the inner diameter side of the retainer. The retaining means comprises a roller retaining click which is bent from an inner diameter edge of the rib portion toward the inside in the axial direction and extends and positioned between the adjacent rollers. The pocket comprises a large-width part whose width in the circumferential direction is relatively large and a small-width part whose width in the circumferential direction is relatively small. When it is assumed that a length of the large-width part in the axial direction is LW, and a length of the small-width part in the axial direction is LN, a dimensional relation such that $0.7 \leqq LN/LW \leqq 1.3$ is satisfied.

According to the above constitution, since the pillar part and the roller retaining click of the retainer prevent the roller from escaping to the outer diameter side and to the inner diameter side, respectively, the configuration of the pillar part can be simple and the pillar part can be positioned more outside. As a result, a distance between the rollers can be reduced. Thus, since the number of the rollers can be increased in a predetermined space, large load capacity can be provided.

Since the roller retaining clicks which are provided at the rib portions prevent the roller from escaping to the inner diameter side, the retainer consists of one component, so that the number of components can be reduced and the costs can be reduced. Since the roller retaining click is provided at the rib portion, it can be partially provided in the axis direction unlike the pillar part. Therefore, the space in the bearing is not reduced and the oil pass-through performance is improved as compared with the case where the pillar part is provided on the inner diameter side.

In addition, since the outer diameter face is in contact with or close to the pillar parts on both sides at the small-width part of the pocket, the roller can be effectively prevented from being skewed. Meanwhile, since relatively large space is formed between the outer diameter face of the roller and the pillar part at the large-width part of the pocket, the oil can preferably pass through the retainer circular part.

In order to provide a preferable skew preventing effect and preferable oil pass-through performance, it is preferable that a ratio (LN/LW) of the length of the small-width part in the axial direction to the length of the large-width part in the axial direction is set within the range of 0.7 to 1.3.

Preferably, the small-width parts are provided at a plurality of positions so as to sandwich the large-width part. When the plurality of small-width parts are provided so as to be apart from each other, the skew preventing effect can be more effectively provided. According to one embodiment, the large-diameter part is positioned in the center of the pocket in the axial direction and the small-width part is positioned at both ends of the pocket in the axial direction.

Preferably, a bending angle between the roller retaining click and the rib portion is within a range of 30 to 90 degrees. In this range of the bending angle, the roller can be retained without falling down and the roller retaining click is not damaged.

A length of the roller retaining click may be set to the extent that it covers a chamfered part of the roller. In other words, the length may be set such that the roller retaining click surely covers the chamfered part but it does not largely protrude from the chamfered part. When the length is set to the extent that it covers the chamfered part, while the roller can be surely prevented from falling down to the inner diameter side, the housing space for the roller can be largely provided as much as possible.

As described above, there can be provided the high-load capacity type of the rollers with the retainer in which the roller is prevented from being skewed and the oil pass-through performance is superior.

According to still another aspect of the present invention, rollers with a retainer comprise the plurality of rollers and the retainer. The retainer comprises a circular part having a diameter larger than a pitch circle diameter of roller arrangement, a rib portion protruding from both sides of the circular part in an axial direction toward an inner diameter side, a plurality of pockets formed in the circular part so as to be arranged in a circumference direction between which a pillar part is formed so as to contain the rollers, retaining means for preventing the roller from escaping to the inner diameter side of the retainer. The retaining means comprises a roller retaining click which is bent from an inner diameter edge of the rib portion toward the inside in the axial direction and extends and positioned between the adjacent rollers.

A corner curved part is provided at each corner of the pocket, and the corner curved part has a radius larger than a chamfered dimension of a chamfered part of the roller and swells out so as to retreat from a pocket wall face.

According to the above constitution, since the pillar part and the roller retaining click of the retainer prevent the roller from escaping to the outer diameter side and to the inner diameter side, respectively, the configuration of the pillar part can be simple and the pillar part can be positioned more outside. As a result, a distance between the rollers can be reduced. Thus, since the number of the rollers can be increased in a predetermined space, large load capacity can be provided.

Since the roller retaining clicks which are provided at the rib portions prevent the roller from escaping to the inner diameter side, the retainer consists of one component, so that the number of components can be reduced and the costs can be reduced. Since the roller retaining click is provided at the rib portion, it can be partially provided in the axis direction unlike the pillar part. Therefore, the space in the bearing is not reduced and the oil pass-through performance is improved as compared with the case where the pillar part is provided on the inner diameter side.

In addition, since the corner curved part of the pocket has the radius larger than the chamfered dimension of the chamfered part, the stress concentration at the corner curved part can be alleviated and the retainer hardness is improved. Furthermore, since the corner curved part swells out so as to retreat from the pocket wall face and the oil can pass through the swollen corner curved part, the oil pass-through performance is improved.

According to one embodiment, the corner curved part swells out in both axial direction and circumferential direction. According to another embodiment, the corner curved part swells out only in the axial direction. According to still another embodiment, the corner curved part swells out only in the circumferential direction.

Preferably, a bending angle between the roller retaining click and the rib portion is within a range of 30 to 90 degrees. In this range of the bending angle, the roller can be retained without falling down and the roller retaining click is not damaged.

A length of the roller retaining click may be set to the extent that it covers a chamfered part of the roller. In other words, the length may be set such that the roller retaining click surely covers the chamfered part but it does not largely protrude from the chamfered part. When the length is set to the extent that it covers the chamfered part, while the roller can be surely prevented from falling down to the inner diameter side, the housing space for the roller can be largely provided as much as possible.

As described above, according to the present invention, there can be provided the high-load capacity type of rollers with the retainer in which retainer hardness is superior and the oil pass-through performance is excellent.

According to still another aspect of the present invention, a retainer comprises the plurality of rollers and the retainer. The retainer comprises a circular part having a diameter larger than a pitch circle diameter of roller arrangement, a rib portion protruding from both sides of the circular part in an axial direction toward an inner diameter side, a plurality of pockets formed in the circular part so as to be arranged in a circumference direction between which a pillar part is formed so as to contain the rollers, retaining means for preventing the roller from escaping to the inner diameter side of the retainer. The retaining means comprises a roller retaining click which is bent from an inner diameter edge of the rib portion toward the inside in the axial direction and extends and positioned between the adjacent rollers. When it is assumed that a distance between the retainer pillar part positioned between the adjacent pockets and the roller is A and a distance between the roller retaining click and the roller is B, a relation such that A<B is provided. In addition, the distances A and B are provided when the rollers are on the pitch circle diameter PCD.

When the above dimensional relation is satisfied, the roller and the roller retaining click are not in contact with each other during the operation of the rollers.

Preferably, when it is assumed that a diameter of an inner diameter face of a housing in which the roller with the retainer is to be set is "D", a diameter of an outer diameter face of the retainer is "d", a protrusion amount of the roller from the outer diameter face of the retainer is "X", a depression amount of the roller from the outer diameter face of the retainer is "Y", the following dimensional relation are provided.

$D-d<X$ $Y>0$

When the above dimensional relation is satisfied, the rollers with the retainer can have the outer diameter guiding structure in which the roller and the outside roller stopper can be surely in contact with each other.

Preferably, a bending angle between the roller retaining click and the rib portion is within a range of 30 to 90 degrees. In this range of the bending angle, the roller can be retained without falling down and the roller retaining click is not damaged.

A length of the roller retaining click may be set to the extent that it covers a chamfered part of the roller. In other words, the length may be set such that the roller retaining click surely covers the chamfered part but it does not largely protrude from the chamfered part. When the length is set to the extent that it covers the chamfered part, while the roller can be surely prevented from falling down to the inner diameter side, the housing space for the roller can be largely provided as much as possible.

As described above, according to the present invention, there can be provided the high-load capacity type of rollers with the retainer in which the roller and the outside roller stopper can be surely in contact with each other during the operation.

DESCRIPTION OF THE PREFERRED EMBODIMENTS

Figure 1:
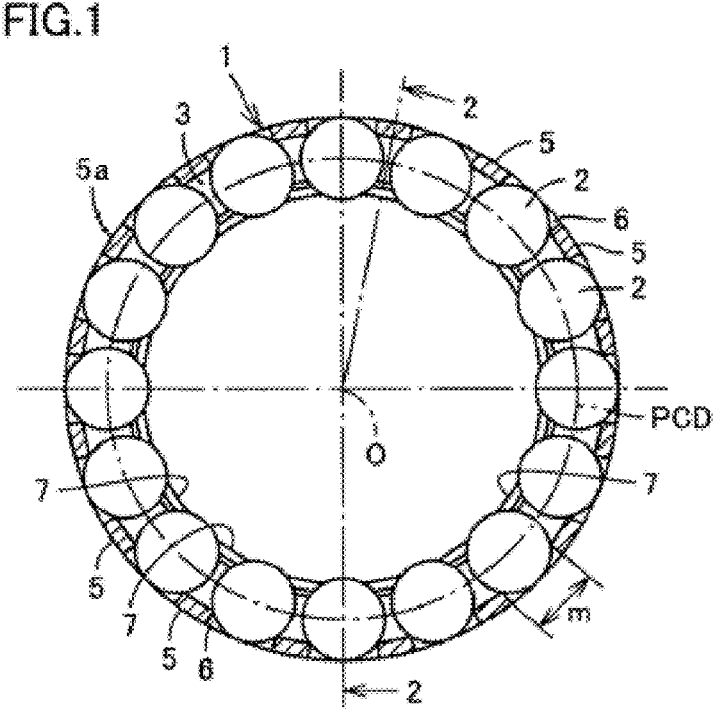
FIG. 1 is a transverse sectional view showing rollers with a retainer according to one embodiment of the present invention.
Figure 2:
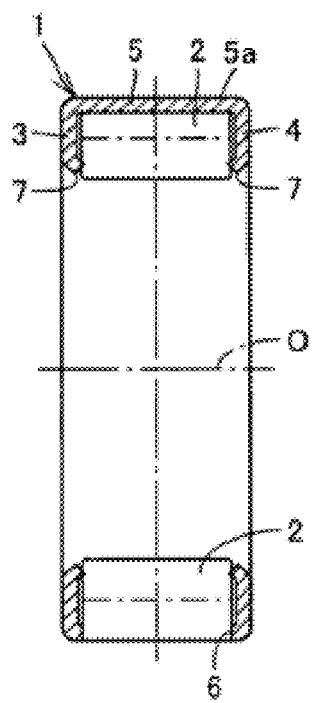
FIG. 2 is a sectional view taken along line 2-2 in FIG. 1.
Figure 3:
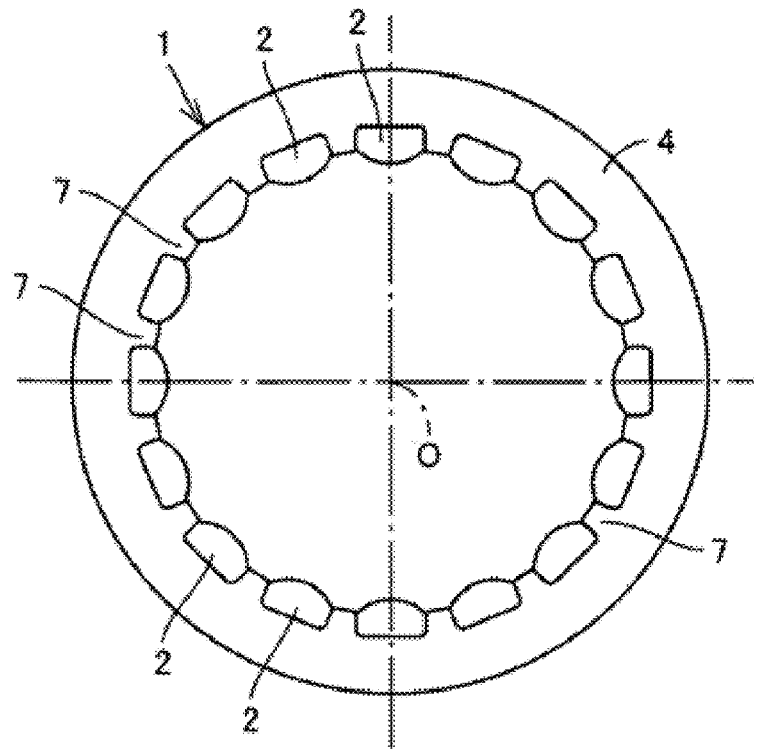
FIG. 3 is a front view showing the rollers with the retainer.

Rollers with a retainer according to one embodiment of the present invention will be described with reference to FIGS. 1 to 5.

The rollers with the retainer comprise a plurality of rollers 2 and a retainer 1, and the roller 2 sidably abuts on an outer diameter face of a shaft and an inner diameter face of a housing (both are not shown). The retainer 1 comprises a circular part 5a having a diameter larger than a pitch circle diameter PCD of roller arrangement and a pair of rib portions 3 and 4 which project from both ends of this circular part 5a toward an inner diameter side. The circular part 5a of the retainer 1 comprises a pillar member 5 and a pocket 6 formed alternately in a circumferential direction. Each pillar member 5 arranged in the circumferential direction has almost a rectangular configuration linearly extending and each roller is housed in the pocket 6 between the adjacent pillar members 5. A distance between the adjacent rollers 2 is retained by the pillar member 5.

The retainer 1 has retaining means which prevents the roller 2 from getting out to an inner diameter side of the retainer. More specifically, the retaining means is a bent-shaped retaining click 7 which projects from an inner diameter edge of each of the rib portions 3 and 4 toward the inner side in an axial direction and positioned between the adjacent rollers 2. The roller 2 is formed of bearing steel and it is a needle roller or a stick roller, for example.

Both rib portions 3 and 4 are flat plates which are almost perpendicular to a center axis O of the retainer. A maximum width "m" of the pocket 6 between the pillar members 5 in the circumference direction is slightly smaller than an outer diameter of the roller 2 and the roller is prevented from escaping to the outer diameter side by the pillar member 5. The pillar member 5 of the retainer 1 is positioned on the outer diameter side with respect to the pitch circle diameter PCD of arrangement of the rollers 1 and the roller retaining click 7 is positioned on the inner diameter side with respect to the pitch circle diameter PCD.

An entire configuration of the retainer 1 is made by machining a steel pipe or pressing a steel plate. The roller retaining click 7 is provided so as to radiate inside from the pair of rib portions 3 and 4. A method of forming the roller retaining click 7 includes pressing, wire cutting, electric discharging and the like. In a stage before the roller 2 is set in, the roller retaining click 7 is not bent toward the inner side in the axial direction and it is positioned in the same plane as the rib portions 3 and 4.

In order to enhance hardness of the retainer 1, the retainer 1 is heat-treated. Although the heat treatment method includes high-frequency quenching, bright quenching, carburized quenching, nitriding process and the like, the heat treatment is preferably the high-frequency quenching and the bright quenching. The retainer 1 contains 0.15 to 1.10% by weight of carbon in consideration of hardenability and press workability.

Figure 5A:
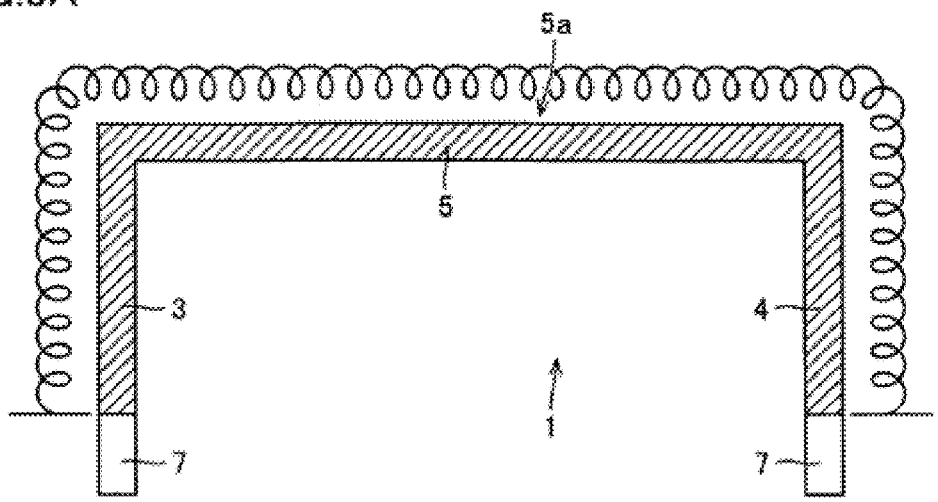
FIG. 5A is a view showing a state in which a part of the retainer other than a roller retaining click is hardened by high-frequency quenching.
Figure 5B:
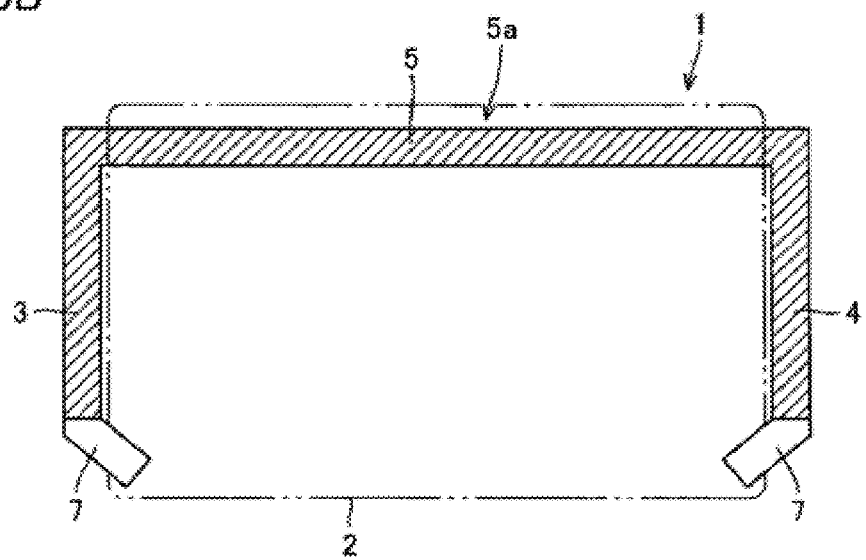
FIG. 5B is a view showing a state after the roller retaining click is bent.

FIGS. 5A and 5B are views to explain the heat treatment and bending process to the retainer 1. According to this embodiment, as shown in FIG. 5A, the high-frequency quenching and high-frequency tempering are performed to the retainer 1 except for the roller retaining click 7 so that the part other than the roller retaining click 7 provides desired hardness. Meanwhile, since the roller retaining click 7 is not quenched and has relatively low hardness, it can be easily bent in a post-treatment. For example, the hardness of the roller retaining click is not more than HV400.

As shown in FIG. 5B, after the roller 2 is set in the heat-treated retainer 1, the roller retaining click 7 is bent inside from inner diameter edge of the rib portion 3 or 4 in the axial direction. As the bending process, a process of pressing or spinning or the like can be used.

Figure 4:
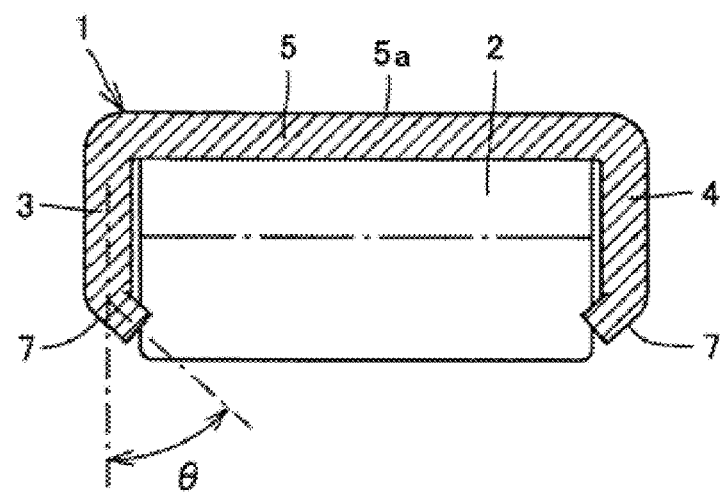
FIG. 4 is a partially enlarged view of FIG. 2.

FIG. 4 shows a configuration of the bent roller retaining click 7. A bending angle θ formed by the roller retaining click 7 and the rib portion 3 or 4 is set at 30 to 90 degrees. When the bending angle of the roller retaining click 7 is less than 30 degrees, the roller 2 could fall off the roller retaining click 7. Meanwhile, when the angle exceeds 90 degrees, the roller retaining click 7 could be damaged. The roller can be retained without falling and the roller retaining click 7 is not damaged within a range of 30 to 90 degrees of the bending angle.

A length of the roller retaining click 7 is preferably set such that it covers a chamfer part of the roller 2. Thus, when the bending angle θ and the length of the roller retaining click 7 are appropriately set, the roller 2 can be surely prevented from falling toward the inner diameter side without reducing a housing space of the roller 2.

Figure 6A:
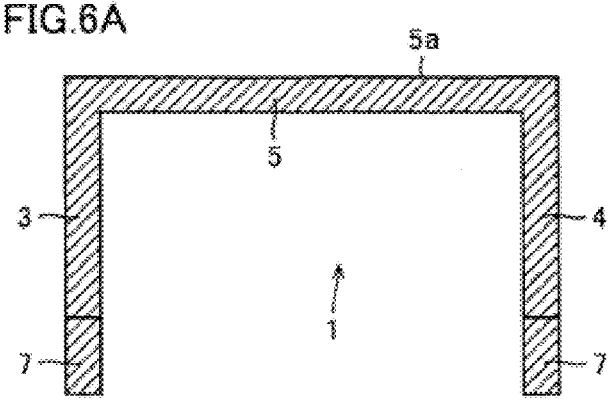
FIG. 6A is a view showing a state after the entire retainer is hardened by bright quenching.
Figure 6B:
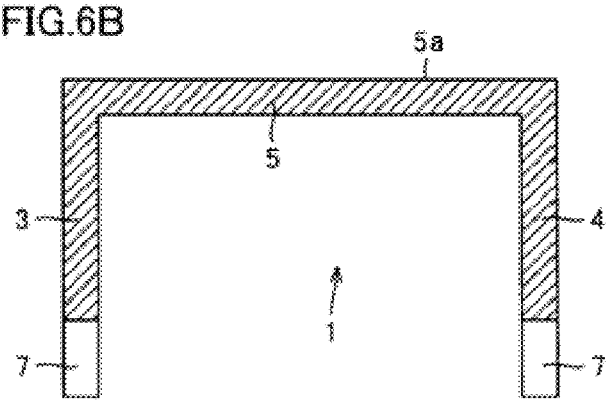
FIG. 6B is a view showing a state after the roller retaining click is annealed.
Figure 6C:
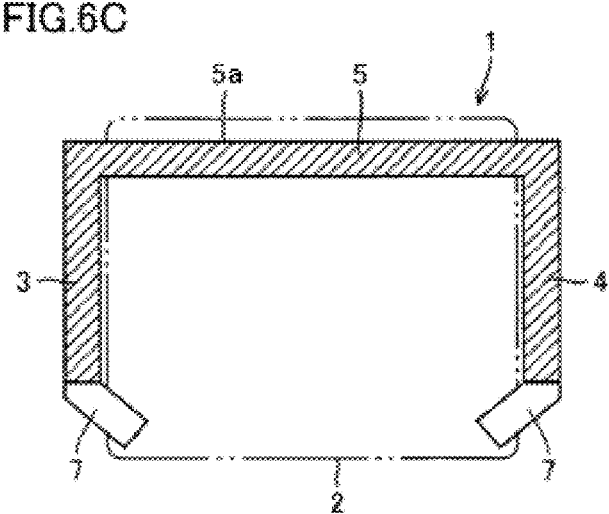
FIG. 6C is a view showing a state after the roller retaining click is bent.

FIGS. 6A, 6B and 6C are views to explain an embodiment in which the bright quenching is performed to the retainer 1. More specifically, as shown in FIG. 6A, the entire retainer 1 including a roller retaining click 7 is bright-quenched and tempered so as to be entirely hardened. Then, as shown in FIG. 6B, only the roller retaining click 7 is annealed to relatively lower the hardness of the roller retaining click 7. The hardness of the roller retaining click 7 is lowered so as to be not more than HV400, for example by this annealing. Then, as shown in FIG. 6C, after the roller 2 is set in, the roller retaining click 7 is bent inside in the axial direction.

According to the embodiment of the present invention, since the high-frequency quenching or the bright quenching is performed to the retainer 1, a depth of the hardened layer can be larger than that provided by carburized quenching, so that the hardness of the retainer can be more improved.

In addition, in the case of the high-frequency quenching, as compared with the case of the carburized quenching, since the number of processing steps is reduced and a processing lead time can be shortened, costs can be reduced. More specifically, when the carburized quenching is used, the following steps are needed in general.

(A) Case where the roller retaining click is prevented from being carburized
   a) Process for preventing the roller retaining click from being carburized
   b) Carburized quenching and tempering
   c) Removal of an agent for preventing carburization from the roller retaining click (B) Case where the entire retainer is carburized
   a) Carburized quenching and tempering for the entire retainer
   b) Annealing process for the roller retaining click Meanwhile, when the high-frequency quenching is performed to the retainer according to the embodiment of the present invention, only the following step is needed.

a) Processes of high-frequency quenching and high-frequency tempering for the part except for the roller retaining click As described above, when the high-frequency quenching is performed to the retainer, the number of processing steps is largely reduced.

Figure 7:
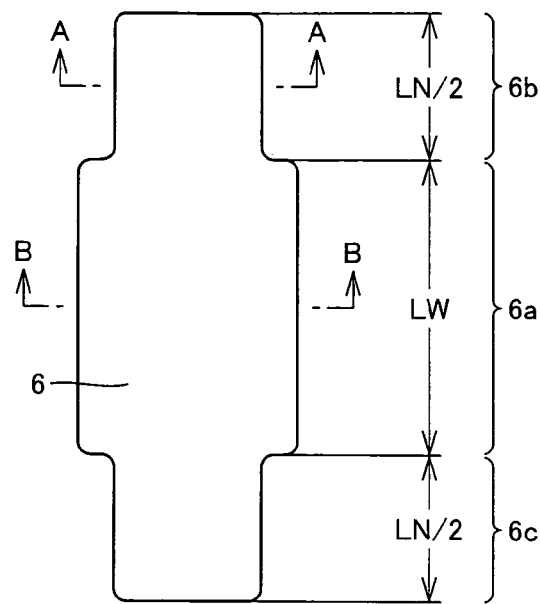
FIG. 7 is an enlarged view showing a pocket of the retainer.
Figure 8:
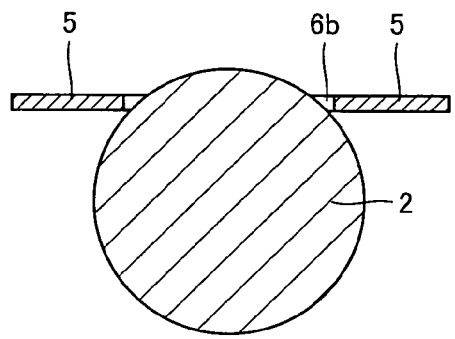
FIG. 8 is a sectional view taken along line A-A in FIG. 7.
Figure 9:
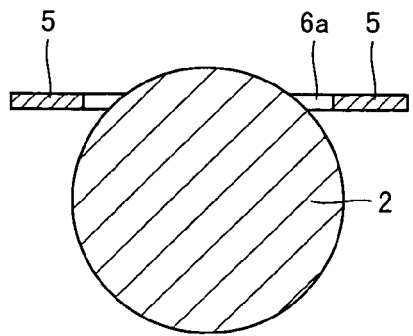
FIG. 9 is a sectional view taken along line B-B in FIG. 7.

FIG. 7 is an enlarged view showing the pocket 6 of the retainer 1. FIG. 8 is a sectional view taken along line A-A in FIG. 7 and FIG. 9 is a sectional view taken along line B-B in FIG. 7. A characteristic configuration of the pocket 6 will be described with reference to the drawings.

The pocket 6 which is long in the axial direction of the roller 2 comprises a large-width part 6a whose width is relatively large in the circumferential direction and small-width parts 6a and 6c whose widths are relatively small in the circumferential direction. Preferably, the small-width parts 6b and 6c are provided so as to sandwich the large-width part 6a. According to the illustrated embodiment, the large-width part 6a is positioned in the center of the pocket 6 in the axial direction and the small-width parts 6b and 6c are positioned at both ends of the pocket 6 in the axial direction.

Since the outer diameter face of the roller 2 is in contact with or close to the pillar member 5 at the small-width part 6b of the pocket 6 as shown in FIG. 8, the roller 2 can be effectively prevented from being skewed. As shown in the illustrated embodiment, when the small-width parts 6b and 6c are provided at both ends of the pocket 6 in the axial direction, the roller 2 can be more effectively prevented from being skewed.

Since a relatively large space is formed between the outer diameter face of the roller 2 and the pillar member 5 at the large-width part 6a of the pocket 6 as shown in FIG. 9, oil can easily pass through the retainer circular part 5a of the retainer. In addition, in order to prevent the roller 2 from getting out to the outer diameter of the retainer, it is preferable that the width of the large-width part 6a in the circumferential direction is set so as to be slightly smaller than a diameter of the roller 2.

In order to effectively prevent the roller 2 from being skewed and to provide preferable oil pass-through performance, a ratio LN/LW of the total length LN of the small-width parts 6b and 6c in the axial direction to the length LW of the large-width part 6a in the axial direction is preferably within a range of 0.7 to 1.3.

In addition, although the large-width part 6a is formed at one place and the small-width parts 6b and 6c are formed at two places in the above illustrated embodiment, as another embodiment, a plurality of large-width parts and small-width parts which are alternately arranged may be provided. As still another embodiment, one large-width part and one small-width part may be provided.

Figure 10:
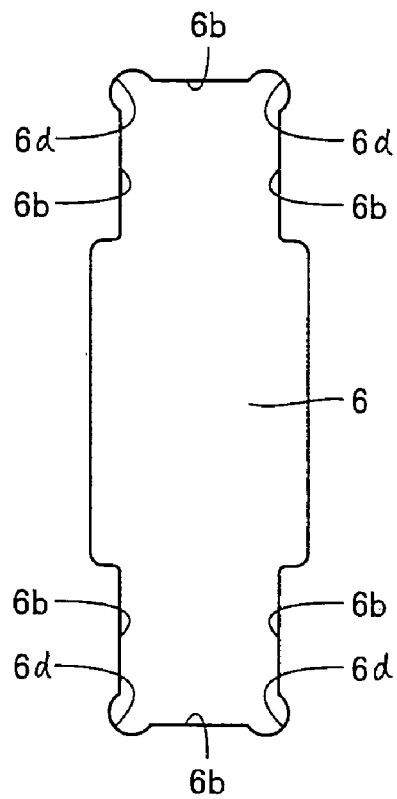
FIG. 10 is an enlarged view showing a pocket of the retainer.
Figure 11:
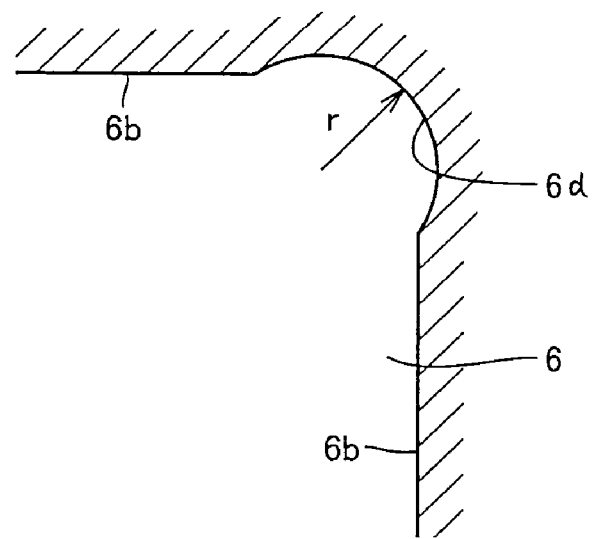
FIG. 11 is an enlarged view showing a corner curved part of the pocket.
Figure 29:
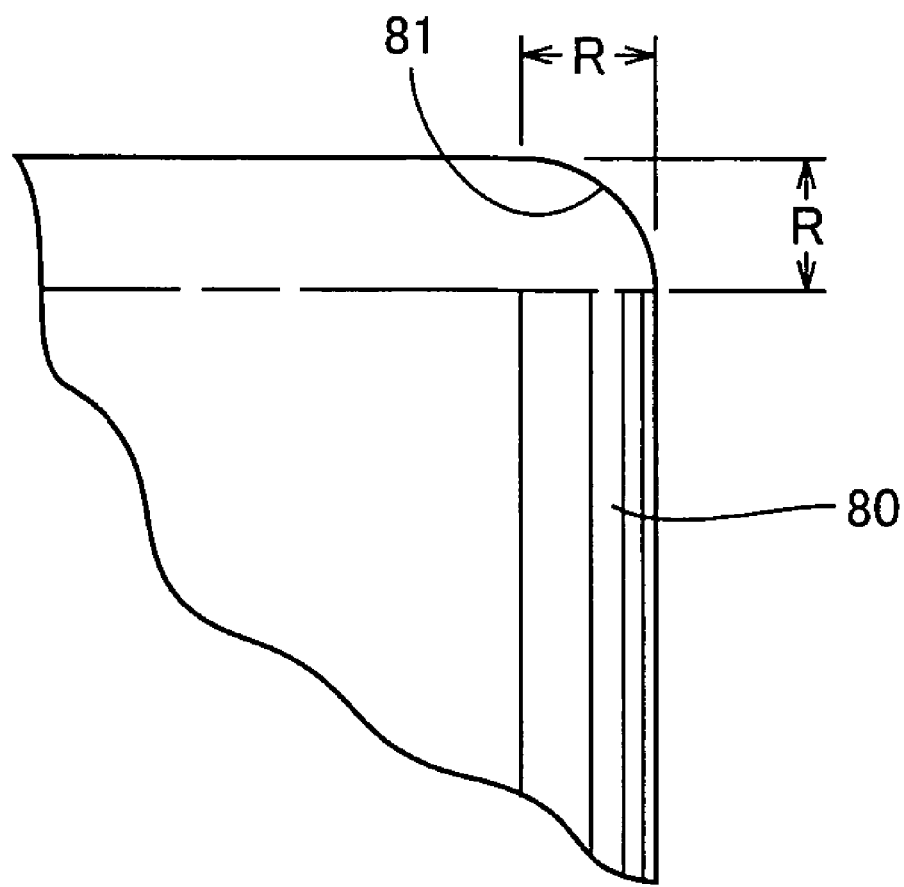
FIG. 29 is an enlarged view showing a chamfered part of the roller.

FIG. 10 is an enlarged view showing a pocket 6 of a retainer 1 according to a preferable embodiment. As shown in FIG. 10, four curved parts 6d are provided at four corners of the pocket 6. FIG. 11 is an enlarged view showing the corner curved part 6d. According to the illustrated embodiment, the corner curved part 6d has a radius "r" larger than a chamfered dimension "R" (refer to FIG. 29) of the roller housed in the pocket 6 and swells out so as to retreat from a wall face 6b of the pocket 6. As shown in the drawing, the corner curved part 6d swells out in the axial direction (vertical direction in FIG. 10) and in the circumferential direction (horizontal direction in FIG. 10).

When the corner curved part 6d which has the large diameter "r" and swells out so as to retreat from the wall face 6b of the pocket is provided, stress concentration at the corner curved part 6d can be alleviated and retainer hardness is improved. In addition, since the oil can pass through the corner curved part 6d, the oil pass-through performance can be improved.

Figure 12:
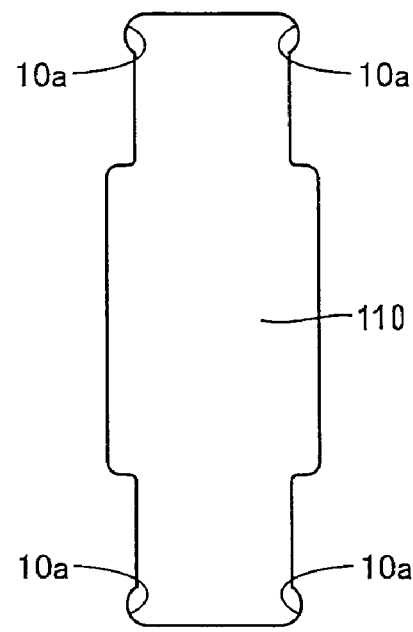
FIG. 12 is a view showing another example of the pocket.

FIG. 12 shows a pocket 110 of a retainer according to another embodiment. A corner curved part 10a according to the illustrated embodiment swells out from a wall face of the pocket 110 only in a circumferential direction (horizontal direction in FIG. 12).

Figure 13:
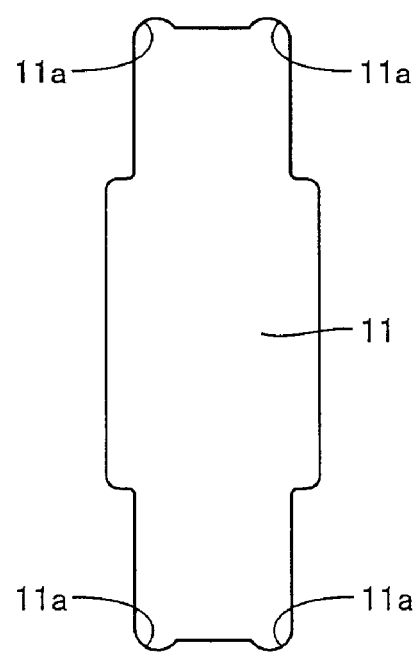
FIG. 13 is a view showing still another example of the pocket.

FIG. 13 shows a pocket 11 of a retainer according to still another embodiment. A corner curved part 11a according to the illustrated embodiment swells out from a wall face of the pocket 11 only in an axial direction (vertical direction in FIG. 13).

Figure 14A:
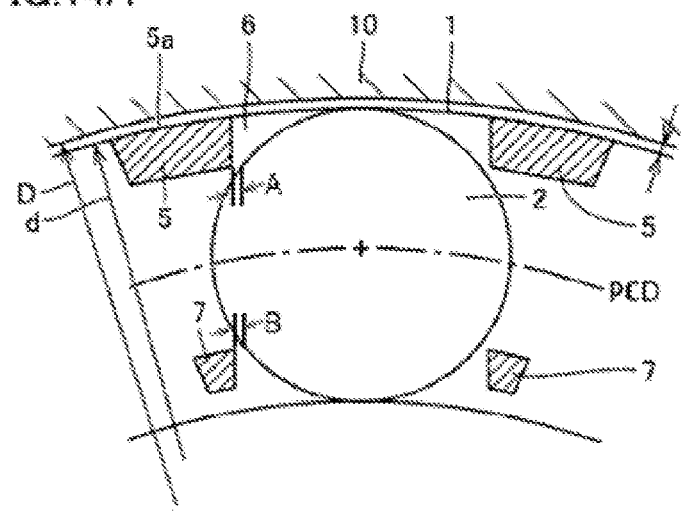
FIG. 14A is a sectional view showing the roller housed in the pocket of the retainer, which shows a state in which the roller is positioned almost in the center.
Figure 14B:
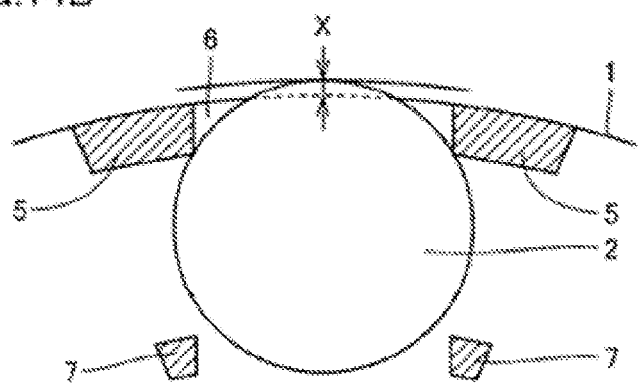
FIG. 14B is a view showing a state in which a part of the roller projects from a retainer outer diameter face.
Figure 14C:
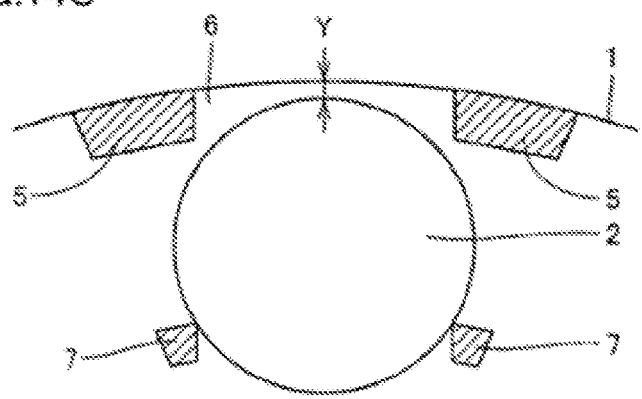
FIG. 14C is a view showing the roller is depressed from the retainer outer diameter face.
Figure 15:
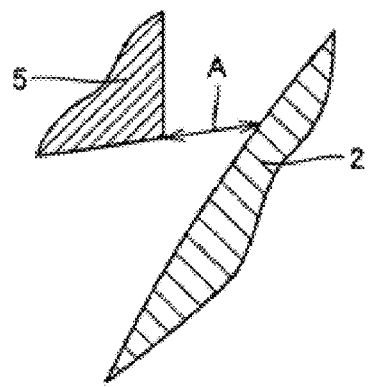
FIG. 15 is an enlarged sectional view showing the roller and the retainer pillar part.
Figure 16:
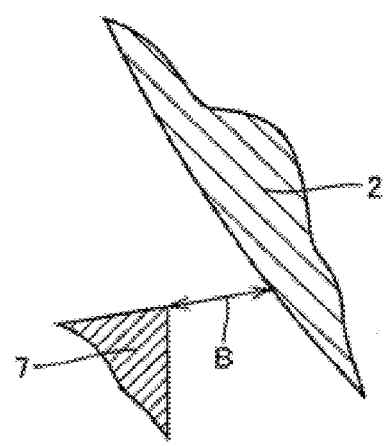
FIG. 16 is an enlarged sectional view showing the roller and the roller retaining click.

FIGS. 14 to 16 show a preferable dimensional relation of each part to implement an outer diameter guiding structure in which the roller 2 and the roller retaining click 7 do not come in contact with each other during the operation of the rollers with the retainer, and the roller 2 and the outside roller stopper (the pillar part 5 of the retainer) are surely in contact with each other according to the preferable embodiment. Referring to the drawings, the dimensional relation of each part according to the embodiment of the present invention will be described.

When it is assumed that a diameter of an inner diameter face of a housing 10 in which the roller with the retainer is to be set is "D", a diameter of an outer diameter face of the retainer 1 is "d", a protrusion amount (refer to FIG. 14B) of the roller 2 from the outer diameter face of the retainer is "X", a depression amount (refer to FIG. 14C) of the roller 2 from the outer diameter face of the retainer is "Y", a distance (refer to FIG. 15) between the retainer pillar part 5 positioned between the adjacent pockets 6 and the roller 2 is "A", and a distance between the roller retaining click 7 and the roller 2 is "B", the following dimensional relation is provided.

$A < B$

Preferably, the following dimensional relation is also provided.

$D - d < X$ $Y > 0$

More preferably, the following relation is also provided.

$X < Y$

In addition, as shown in FIG. 14B, the protrusion amount "X" of the roller 2 is an amount of projection of the roller 2 when it is pressed toward the outer diameter side. The depression amount "Y" of the roller 2 is an amount of depression of the roller 2 when it is pressed toward the inner diameter side as shown in FIG. 14C.

As shown in FIGS. 15 and 16, the distance "A" between the retainer pillar part 5 and the roller 2 and the distance "B" between the roller retaining click 7 and the roller 2 are the distances when the roller 2 is positioned on the pitch circle diameter PCD. These distances have the following relation.

A<B

When the distance "B" between the roller retaining click 7 and the roller 2 is larger than the distance "A" between the retainer pillar part 5 and the roller 2, the roller 2 and the roller retaining click 7 are not in contact with each other during the operation of the rollers with the retainer. In addition, when the projection amount "X" is larger than a distance between the diameter "D" of the housing inner diameter face and the diameter "d" of the retainer outer diameter face, and the depression amount "Y" of the roller is larger than 0, the outer diameter guiding structure in which the roller and the outside roller stopper (retainer pillar part) are in contact with each other can be provided.

Figure 17:
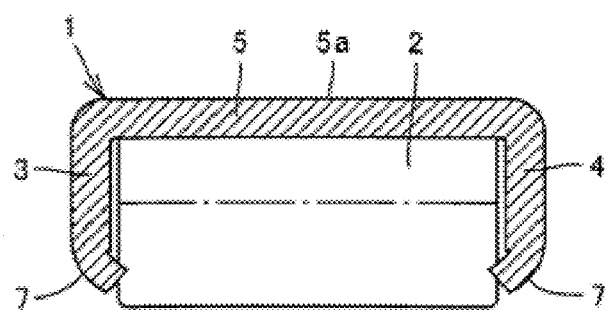
FIG. 17 is a sectional view showing a variation of the roller retaining click of the rollers with the retainer.
Figure 18:
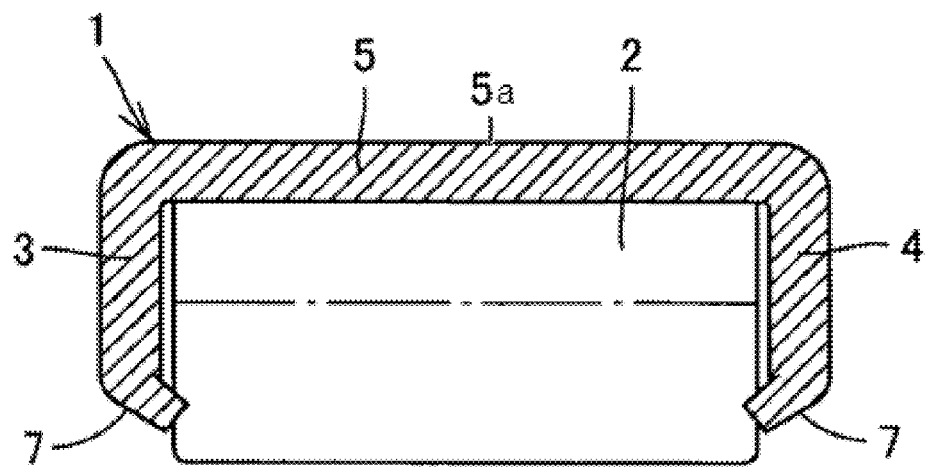
FIG. 18 is a sectional view showing another variation of the roller retaining click of the rollers with the retainer.

Although the roller retaining click 7 is bent from the rib part 3 or 4 inside in the axial direction and linearly extends in the embodiment shown in FIG. 4, as another embodiment, as shown in FIG. 17, a roller retaining click 7 may have an arc-shaped curved configuration in which an inner side thereof is recessed. Alternatively, as shown in FIG. 18, a configuration of the roller retaining click 7 may be tapered such that a thickness thereof is reduced toward its tip end.

According to the roller with the retainer in this embodiment of the present invention, since the pillar part 5 and the roller retaining click 7 of the retainer 1 prevent the roller 2 from escaping to the outer diameter side and to the inner diameter side, respectively, the configuration of the pillar part 5 can be simple and the pillar part 5 can be positioned more outside. As a result, the distance between the rollers can be reduced and the number of the rollers can be increased in a predetermined space, so that large load capacity can be provided.

Since the roller 2 is prevented from escaping to the inner diameter side by the roller retaining clicks 7 which are bent from the inner diameter edges of the rib portions 3 and 4 of the retainer 1 and protrude, the retainer 1 consists of one component, so that the number of components can be reduced and the costs can be reduced. In addition, since a region occupied by the roller retaining click 7 is small, the space in the bearing is not reduced, so that the oil pass-through performance can be improved as compared with a case where a pillar part is provided on the inner diameter side.

Figure 19:
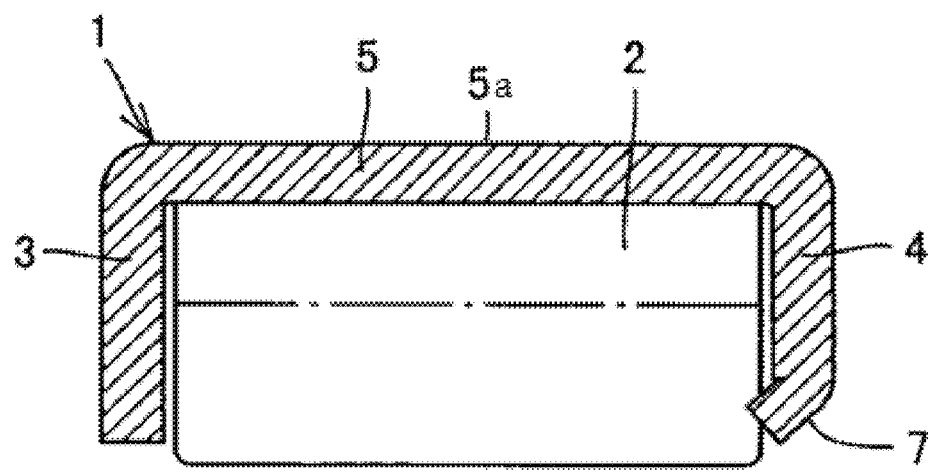
FIG. 19 is a sectional view showing a variation of the retainer of the rollers with the retainer.
Figure 20A:
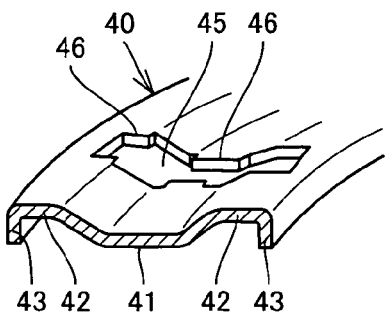
FIG. 20A is a partially perspective view showing a retainer of a conventional roller with a retainer.
Figure 20B:
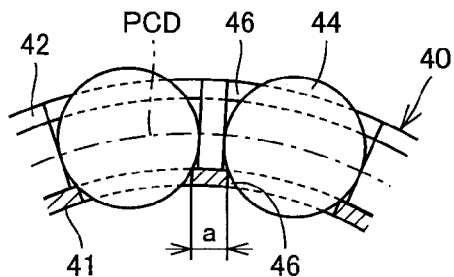
FIG. 20B is a partially sectional view showing the conventional rollers with the retainer.
Figure 21:
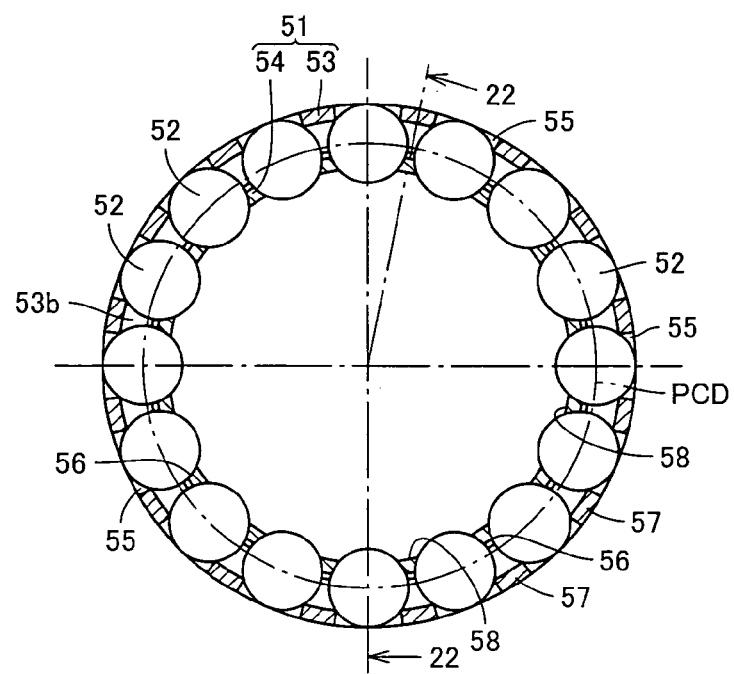
FIG. 21 is a transverse sectional view showing another example of the conventional rollers with the retainer.
Figure 22:
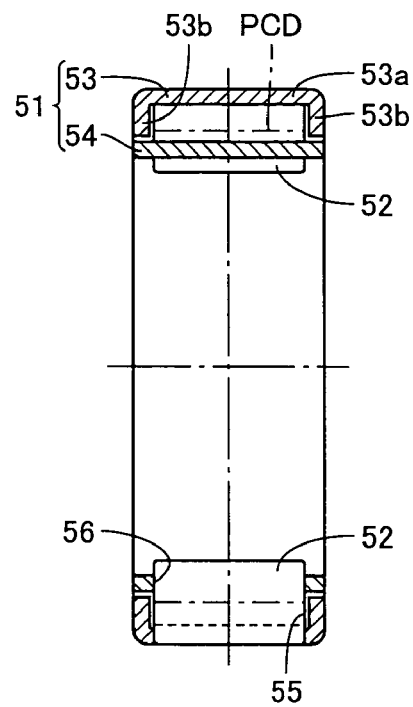
FIG. 22 is a sectional view taken along line 22-22 in FIG. 21.
Figure 23:
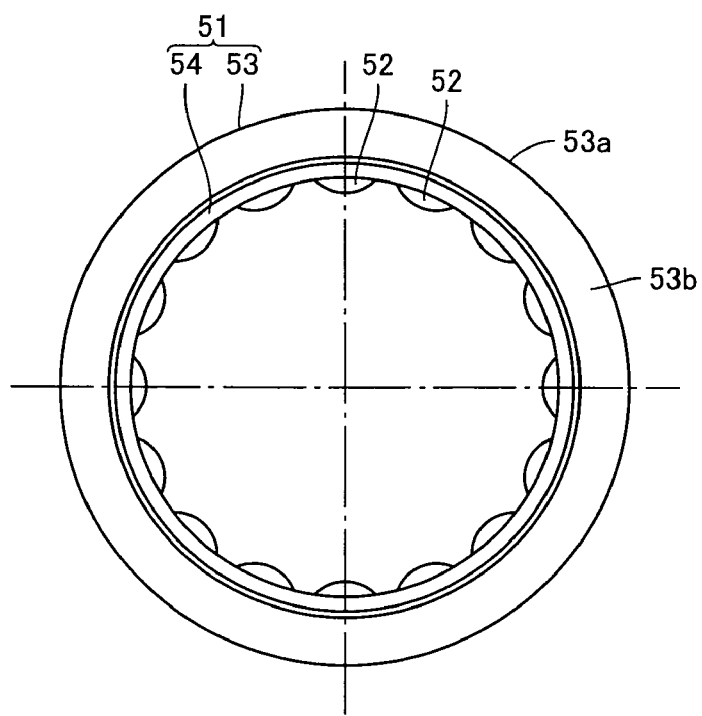
FIG. 23 is a front view showing the rollers with the retainer shown in FIG. 21.
Figure 24:
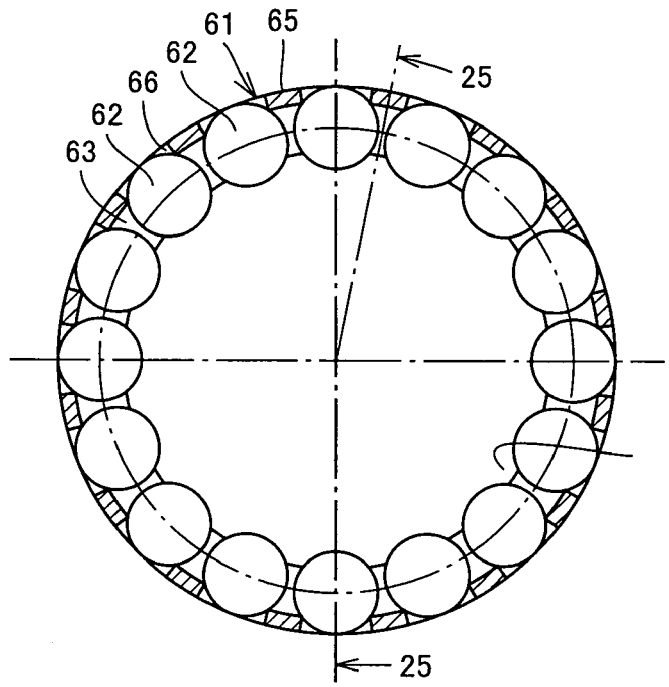
FIG. 24 is a transverse sectional view showing still another example of the conventional rollers with the retainer.
Figure 25:
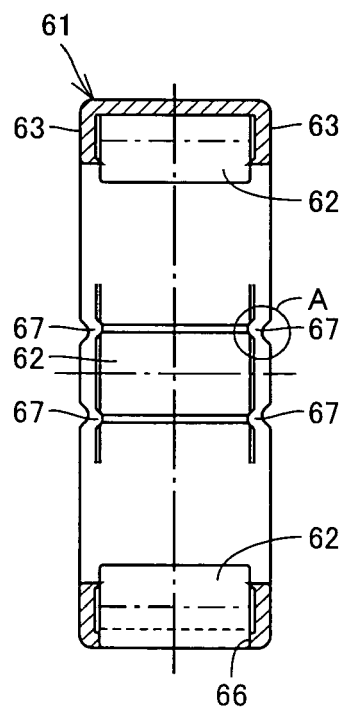
FIG. 25 is a sectional view taken along line 25-25 in FIG. 24.
Figure 26A:
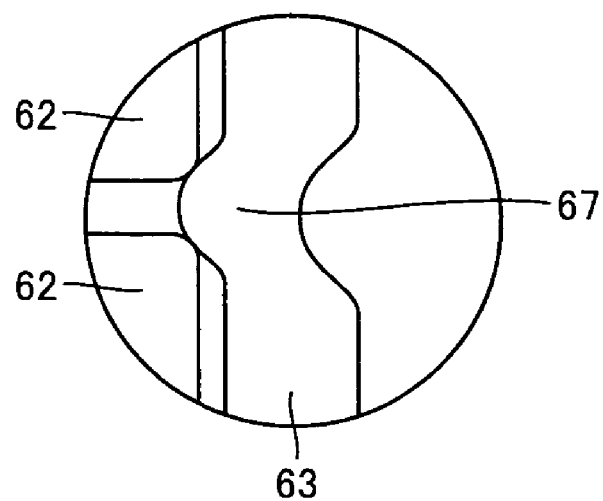
FIG. 26A is an enlarged view showing a part A of retaining means in FIG. 25.
Figure 26B:
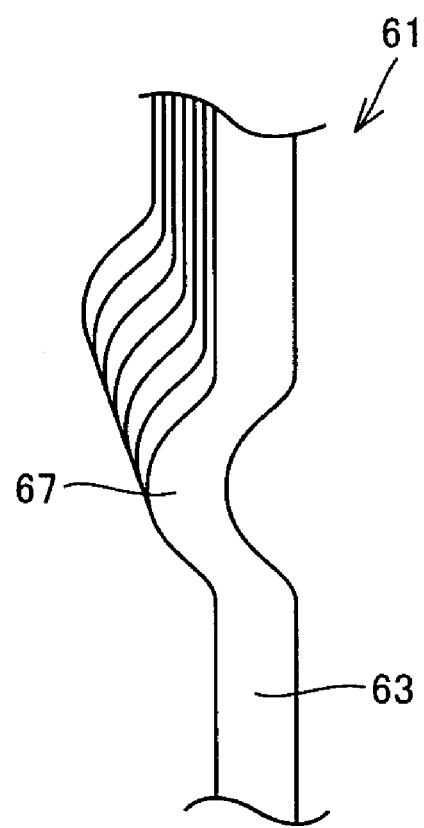
FIG. 26B is a perspective view showing the retaining means.
Figure 27:
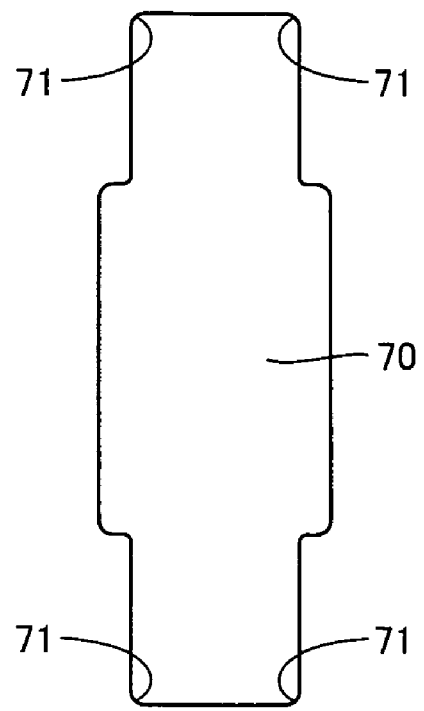
FIG. 27 is a view showing a pocket of the conventional retainer.
Figure 28:
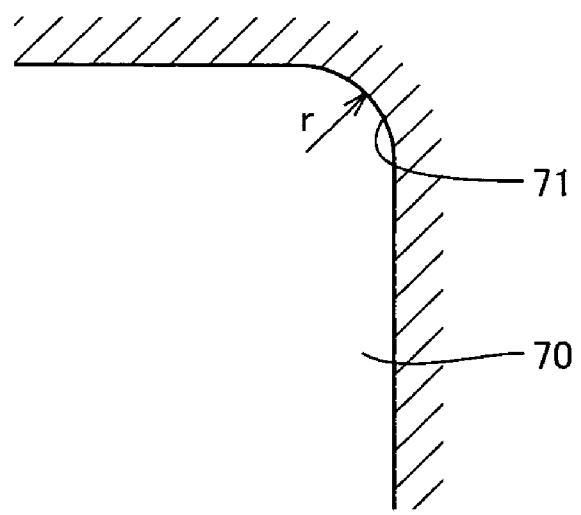
FIG. 28 is an enlarged view showing a corner curved part of the pocket shown in FIG. 27.

FIG. 19 shows still another embodiment of the present invention. According to this embodiment, a roller retaining click 7 is provided only at one rib portion 4. When the roller retaining click 7 is provided only at one rib portion, although one end of the roller 2 is supported by the roller retaining click 7, the other end could be inclined toward the inner diameter side. In this case, if a relation between a distance between the rib portions 3 and 4 and a length of the roller 2 is appropriately set, the other end of the roller 2 abuts on an inner face of the rib portion 3 and it is prevented from escaping to the inner diameter side. The roller retaining click 7 prevents the roller 2 from escaping when the rollers with the retainer is handled alone. In other words, since the roller retaining click 7 is not needed in a state the rollers with the retainer is incorporated in a machine, even when the roller 2 is retained in the inclined state, which does not affect performance in use. When the roller retaining click 7 is provided only at one rib portion 4, its manufacturing can be simple and the cost can be reduced.

Although the embodiments of the present invention have been described with reference to the drawings, the present invention is not limited to the illustrated embodiment. Various kinds of modifications and variations can be added to the illustrated embodiments in the same or equivalent scope of the present invention.

What is claimed is:

1. A roller arrangement having a pitch circle diameter PCD, the roller arrangement comprising:
   a plurality of rollers;
   a retainer comprising a circular part having an outer face of diameter d that is larger than the PCD of the roller arrangement; and
   a housing having an inner face of diameter D upon which the plurality of rollers can slidably abut,
   wherein the retainer further comprises,
   a rib portion protruding from both sides of the circular part in an axial direction toward an inner diameter side of the retainer,
   a plurality of pockets formed in the circular part, the plurality of pockets arranged in a circumferential direction between which a plurality of pillar parts are formed, the plurality of pillar parts being configured to contain at least one roller, and
   retaining means for preventing the at least one roller from escaping to the inner diameter side of the retainer,
   wherein the retaining means comprises,
      a roller retaining click bent from an inner diameter edge of the rib portion toward an inside of the retainer in the axial direction, the roller retaining click being configured to extend between adjacent rollers,
   wherein the retainer is configured to enable the at least one roller to protrude a distance X from the outer face of the retainer and toward the inner face of the housing and further configured to enable the at least one roller to depress a distance Y from the outer face of the retainer and toward the PCD, such that when the at least one roller is substantially centered between two adjacent pillar parts and substantially positioned on the PCD, then a distance between the adjacent retainer pillar parts and the at least one roller will be A and a distance between the roller retaining click and the at least one roller will be B,
   wherein A<B, D−d<X, and Y>0.

2. A roller arrangement according to claim 1, wherein a bending angle between the roller retaining click and the rib portion is 30 to 90 degrees.

3. A roller arrangement according to claim 1, wherein a length of the roller retaining click is configured to extend to cover a chamfered part of the at least one roller.

* * * * *